(12) United States Patent
Jeon et al.

(10) Patent No.: US 11,046,181 B2
(45) Date of Patent: Jun. 29, 2021

(54) APPARATUS AND METHOD FOR CONTROLLING TRANSMISSION OF VEHICLE

(71) Applicants: Hyundai Motor Company, Seoul (KR); Kia Motors Corporation, Seoul (KR)

(72) Inventors: Byeong Wook Jeon, Seoul (KR); Dong Hoon Jeong, Hwaseong-si (KR); Jae Chang Kook, Hwaseong-si (KR); Kwang Hee Park, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/677,193

(22) Filed: Nov. 7, 2019

(65) Prior Publication Data

US 2020/0391592 A1 Dec. 17, 2020

(30) Foreign Application Priority Data

Jun. 11, 2019 (KR) ........................ 10-2019-0068419

(51) Int. Cl.
*B60K 31/00* (2006.01)
*F16H 61/02* (2006.01)

(52) U.S. Cl.
CPC ..... *B60K 31/0008* (2013.01); *F16H 61/0213* (2013.01); *B60K 2031/0025* (2013.01); *B60K 2031/0033* (2013.01); *B60W 2510/0647* (2013.01); *B60W 2520/10* (2013.01); *B60W 2554/4041* (2020.02); *B60W 2554/4042* (2020.02); *B60W 2554/801* (2020.02); *B60W 2554/804* (2020.02); *B60W 2710/1005* (2013.01); *F16H 2061/0237* (2013.01)

(58) Field of Classification Search
None
See application file for complete search history.

(56) References Cited

U.S. PATENT DOCUMENTS

2005/0125137 A1* 6/2005 Shiiba ................ B60W 10/184
 701/96
2018/0100579 A1* 4/2018 Noguchi ............. F16H 61/0213

FOREIGN PATENT DOCUMENTS

| JP | 3736017 B2 | 1/2006 |
| JP | 4190041 B2 | 12/2008 |
| KR | 10-1734252 B1 | 5/2017 |

* cited by examiner

*Primary Examiner* — Timothy Hannon
(74) *Attorney, Agent, or Firm* — Morgan, Lewis & Bockius LLP

(57) ABSTRACT

An apparatus for controlling a transmission of a vehicle includes: a determination device that decides whether to perform a forward vehicle-based deceleration tracking control, based on information of the vehicle and a forward vehicle, when the vehicle starts to coast; a calculation device that calculates a target velocity and a target distance based on a position and a velocity of the forward vehicle, when the forward vehicle-based deceleration tracking control is decided to be performed; a gear position decision device that constructs deceleration profiles for respective gears and decides a final gear based on the target velocity and the target distance calculated; and a controller that controls the transmission based on the final gear.

19 Claims, 8 Drawing Sheets

APPARATUS AND METHOD FOR CONTROLLING TRANSMISSION OF VEHICLE

CROSS-REFERENCE TO RELATED APPLICATION

This application claims the benefit of priority to Korean Patent Application No. 10-2019-0068419, filed in the Korean Intellectual Property Office on Jun. 11, 2019, the entire contents of which are incorporated herein by reference.

TECHNICAL FIELD

The present disclosure relates to an apparatus and method for controlling a transmission of a vehicle.

BACKGROUND

An automatic transmission performs gear shift depending on only a gear decision map for a vehicle velocity, which is set in advance in a Transmission Control Unit (TCU), because the automatic transmission cannot recognize the velocity of a forward vehicle.

A driver accelerates a host vehicle to follow the forward vehicle when the velocity of the forward vehicle is higher than the velocity of the host vehicle, whereas the driver inevitably decelerates the host vehicle when the velocity of the host vehicle is higher than the velocity of the forward vehicle.

In the case of performing the deceleration for the purpose of reducing the velocity of the host vehicle, the driver has to operate a brake pedal again when a reduction in the velocity of the host vehicle is small after a tip-out of an accelerator pedal occurs, or the driver has to operate the accelerator pedal when the velocity of the host vehicle is too rapidly reduced by an engine brake effect.

As described above, the frequency of acceleration and/or braking may be increased for the purpose of following the forward vehicle, which may lead to deterioration in driver convenience. Furthermore, the fuel consumption may be increased due to the re-acceleration after the deceleration.

SUMMARY

The present disclosure has been made to solve the above-mentioned problems occurring in the prior art while advantages achieved by the prior art are maintained intact.

An aspect of the present disclosure provides a transmission control apparatus and method of a vehicle for deciding a final gear based on the position and velocity of a forward vehicle when decelerating the vehicle due to the difference in velocity between the vehicle and the forward vehicle, thereby reducing the frequency of deceleration and re-acceleration, which in turn improves driver convenience and decelerates the vehicle in a fuel-efficient state.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a transmission of a vehicle includes: a determination device that decides whether to perform a forward vehicle-based deceleration tracking control, based on information of the vehicle and a forward vehicle, when the vehicle starts to coast; a calculation device that calculates a target velocity and a target distance based on a position and a velocity of the forward vehicle, when the forward vehicle-based deceleration tracking control is decided to be performed; a gear position decision device that constructs deceleration profiles for respective gears and decides a final gear based on the target velocity and the target distance calculated; and a controller that controls the transmission based on the final gear.

The determination device may decide to perform the forward vehicle-based deceleration tracking control, when a velocity and deceleration of the vehicle, a velocity and acceleration of the forward vehicle, and a distance and a relative velocity between the vehicle and the forward vehicle satisfy reference conditions.

The determination device may determine whether the distance between the vehicle and the forward vehicle is longer than a minimum reference distance and shorter than a maximum reference distance.

The determination device may determine whether the velocity of the vehicle exceeds the sum of the velocity of the forward vehicle and a set value.

The determination device may determine whether the deceleration of the vehicle exceeds reference deceleration and the acceleration of the forward vehicle exceeds reference acceleration.

The determination device may determine whether the relative velocity between the vehicle and the forward vehicle is below a reference velocity.

The calculation device may calculate the target velocity by adding a threshold value to the velocity of the forward vehicle.

The threshold value may be a value between a preset minimum threshold velocity and a preset maximum threshold velocity and may be varied depending on a change in the velocity of the forward vehicle.

The calculation device may calculate the target distance by subtracting an offset distance from a distance between the vehicle and the forward vehicle.

The offset distance may be set to an inter-vehicle distance that is maintained based on the velocity of the forward vehicle.

The gear position decision device may identify a target position based on the target distance and may decide, as the final gear, a gear converging to the target velocity at the target position, based on the deceleration profiles for the respective gears.

According to another aspect of the present disclosure, a method for controlling a transmission of a vehicle includes: deciding whether to perform a forward vehicle-based deceleration tracking control, based on information of the vehicle and a forward vehicle, when the vehicle starts to coast; calculating a target velocity and a target distance based on a position and a velocity of the forward vehicle, when the forward vehicle-based deceleration tracking control is decided to be performed; constructing deceleration profiles for respective gears and deciding a final gear based on the target velocity and the target distance calculated; and controlling the transmission based on the final gear.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
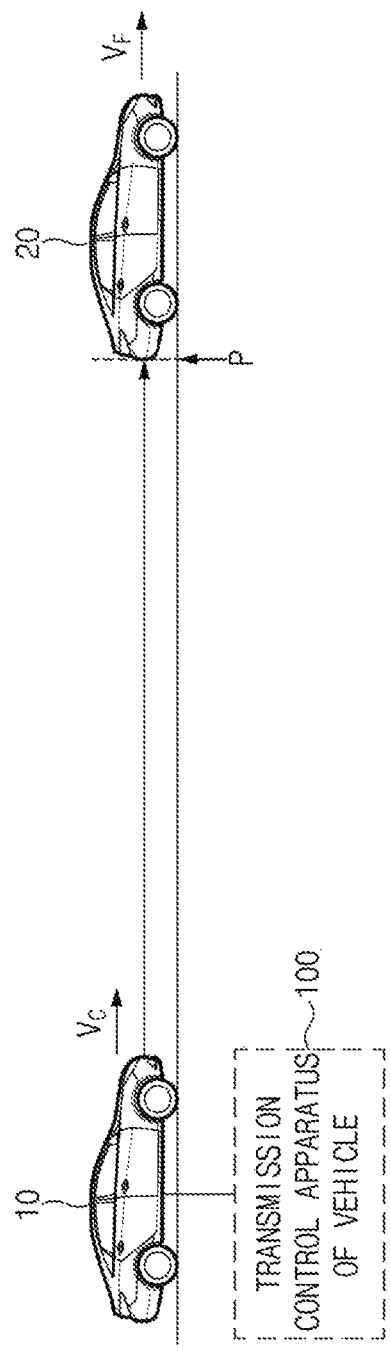
FIG. 1 is a view illustrating a system to which a transmission control apparatus of a vehicle according to an exemplary embodiment of the present disclosure is applied.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a system to which a transmission control apparatus of a vehicle according to an exemplary embodiment of the present disclosure is applied.

Referring to FIG. 1, the transmission control apparatus 100 of the vehicle 10 according to the present disclosure may be implemented in the vehicle 10. The transmission control apparatus 100 of the vehicle 10 may be integrated with control units in the vehicle 10, or may be implemented as a separate apparatus and may be connected with the control units of the vehicle 10 by separate connecting means.

Referring to FIG. 1, when the vehicle 10 starts to coast after an accelerator and a brake are switched off during travel of the vehicle 10, the transmission control apparatus 100 of the vehicle 10 may detect whether a forward vehicle 20 is present within a reference range ahead, by using a sensor such as radar. For example, the transmission control apparatus 100 of the vehicle 10 may detect whether the forward vehicle 20 is present within a distance of 150 meters ahead.

When the forward vehicle 20 is present within the reference range, the transmission control apparatus 100 of the vehicle 10 may detect the distance and/or the relative velocity between the vehicle 10 and the forward vehicle 20.

Furthermore, the transmission control apparatus 100 of the vehicle 10 may obtain information regarding the current position of the vehicle 10 and information regarding the state of a road ahead from a navigation system 15.

The transmission control apparatus 100 of the vehicle 10 may decide whether to perform deceleration tracking control, based on the distance and the relative velocity between the vehicle 10 and the forward vehicle 20, the deceleration of the vehicle 10, and/or the acceleration of the forward vehicle 20.

The transmission control apparatus 100 of the vehicle 10, when performing the deceleration tracking control, may decide a target velocity and a target position with respect to the velocity and the position of the forward vehicle 20 and may control a transmission of the vehicle 10 based on a deceleration profile.

A detailed configuration of the transmission control apparatus 100 of the vehicle 10 will be described below with reference to FIG. 2.

Figure 2:
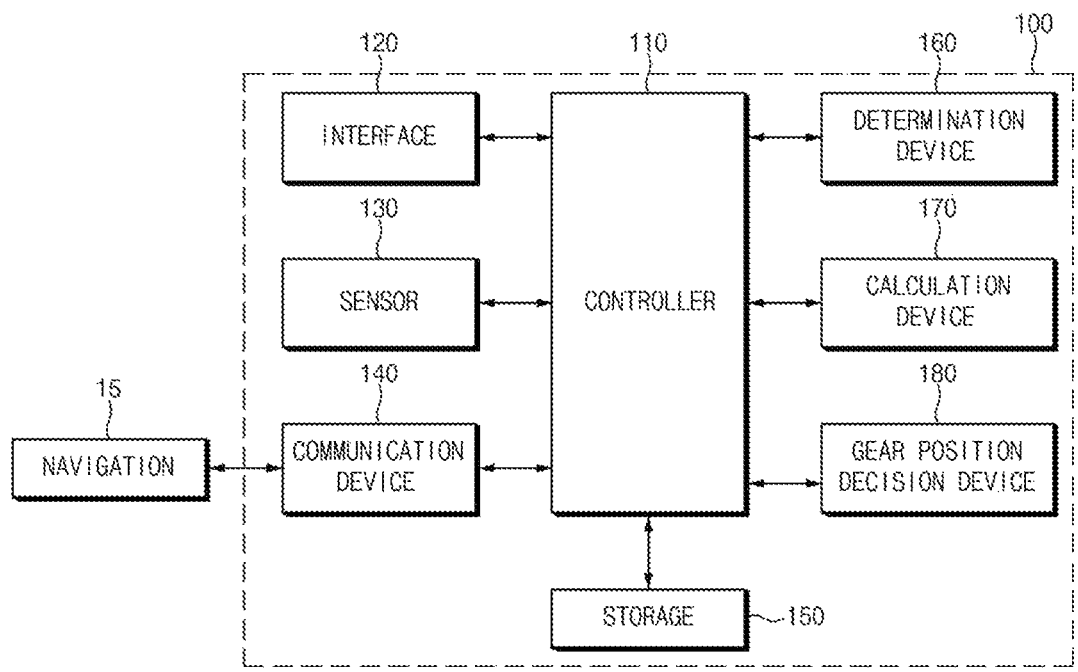
FIG. 2 is a view illustrating a configuration of the transmission control apparatus of the vehicle according to an exemplary embodiment of the present disclosure.

FIG. 2 is a view illustrating a configuration of the transmission control apparatus of the vehicle according to an exemplary embodiment of the present disclosure.

Referring to FIG. 2, the transmission control apparatus 100 of the vehicle 10 may include a controller 110, an interface 120, a sensor 130, a communication device 140, storage 150, a determination device 160, a calculation device 170, and a gear position decision device 180. The controller 110, the determination device 160, the calculation device 170, and the gear position decision device 180 of the transmission control apparatus 100 according to this embodiment may be implemented as at least one processor. The controller 110 may be implemented in the form that includes the determination device 160, the calculation device 170, and the gear position decision device 180.

The controller 110 may process signals transferred between the components of the transmission control apparatus 100.

The interface 120 may include an input device for receiving a control command from a user and an output device for outputting operational states and results of the transmission control apparatus 100.

The input device may include a key button and may also include a mouse, a joystick, a jog shuttle, a stylus pen, or the like. Furthermore, the input device may include a soft key implemented on a display.

The output device may include a display. When the display is equipped with a touch sensor such as a touch film, a touch sheet, a touch pad, or the like, the display may operate as a touch screen and may be implemented in the form in which an input device and an output device are integrated with each other.

The display may include at least one of a Liquid Crystal Display (LCD), a Thin Film Transistor Liquid Crystal Display (TFF LCD), an Organic Light-Emitting Diode (OLED) display, a flexible display, a Field Emission Display (FED), and a three-dimensional (3D) display.

The sensor 130 may include one or more sensors that detect an obstacle, for example, the forward vehicle 20 around the vehicle 10 and measure the distance and/or the relative velocity between the vehicle 10 and the forward vehicle 20. For example, the sensor 130 may include radar, an ultrasonic sensor, a scanner, a camera, and/or the like. In addition to the aforementioned sensors, any sensors capable of detecting an obstacle and measuring a distance are applicable.

The sensor 130 may further include a sensor that measures the velocity and/or the acceleration of the vehicle 10.

The communication device 140 may include a communication module for in-vehicle network communication with electronic units and/or the control units in the vehicle 10. For example, the communication module may be communicatively coupled with the navigation system 15 in the vehicle 10 and may receive, from the navigation system 15, the position information of the vehicle 10 and/or the state information of the road ahead.

The in-vehicle network communication technology may include Controller Area Network (CAN) communication, Local Interconnect Network (LIN) communication, Flex-Ray communication, or the like.

The communication device 140 may further include a communication module for wireless Internet access or short range communication.

The wireless Internet technology may include Wireless LAN (WLAN), Wireless Broadband (Wibro), Wi-Fi, World Interoperability for Microwave Access (Wimax), or the like. The short range communication technology may include Bluetooth, ZigBee, Ultra-Wideband (UWB), Radio Frequency Identification (RFID), Infrared Data Association (IrDA), or the like.

The storage 150 may store data and/or algorithms required for the transmission control apparatus 100 of the vehicle 10 to operate.

For example, the storage 150 may store the position information of the vehicle 10 and/or the state information (e.g., the curvature, the grade, and the like) of the road ahead that are received through the navigation system 15. Furthermore, the storage 150 may store information regarding the forward vehicle 20 that is detected by the sensor 130. In addition, the storage 150 may store instructions and/or algorithms for deciding the target velocity and the target position based on the position information of the vehicle 10 and the information of the forward vehicle 20, performing the deceleration tracking control, and deciding the final gear to control the transmission.

The storage 150 may include a storage medium such as a Random Access Memory (RAM), a Static Random Access Memory (SRAM), a Read-Only Memory (ROM), a Programmable Read-Only Memory (PROM), or an Electrically Erasable Programmable Read-Only Memory (EEPROM).

When the vehicle 10 transitions to a coasting state after the accelerator and the brake of the vehicle 10 are switched to a turned-off state, the determination device 160 determines whether the forward vehicle 20 is present within the reference range ahead. The reference range may be set based on the measurement range of a sensor that detects the forward vehicle 20.

Furthermore, based on the position and the velocity of the vehicle 10, the position and the velocity of the forward vehicle 20, the distance between the vehicle 10 and the forward vehicle 20, and the like, the determination device 160 may decide whether to perform the deceleration tracking control based on the forward vehicle 20.

For example, the determination device 160 determines whether the distance between the vehicle 10 and the forward vehicle 20 is longer than a minimum reference distance and shorter than a maximum reference distance.

Furthermore, the determination device 160 determines whether the velocity of the vehicle 10 exceeds the sum of the velocity of the forward vehicle 20 and a set value.

Moreover, the determination device 160 may determine whether the deceleration of the vehicle 10 exceeds reference deceleration and the acceleration of the forward vehicle 20 exceeds reference acceleration.

For example, the reference deceleration may be −5 KPH/s. The reference acceleration may be +10 KPH/s. Accordingly, the determination device 160 may determine whether the deceleration of the vehicle 10 exceeds −5 KPH/s and the acceleration of the forward vehicle 20 exceeds +10 KPH/s.

In addition, the determination device 160 may determine whether the relative velocity between the vehicle 10 and the forward vehicle 20 is below a reference velocity.

For example, the relative velocity between the vehicle 10 and the forward vehicle 20 may be, but is not limited to, 3 KPH.

The determination device 160 may decide to perform the deceleration tracking control based on the forward vehicle 20, when it is determined that the distance between the vehicle 10 and the forward vehicle 20 is longer than the minimum reference distance and shorter than the maximum reference distance, the velocity of the vehicle 10 exceeds the sum of the velocity of the forward vehicle 20 and the set value, the deceleration of the vehicle 10 exceeds the reference deceleration, the acceleration of the forward vehicle 20 exceeds the reference acceleration, and the relative velocity between the vehicle 10 and the forward vehicle 20 is below the reference velocity.

The determination device 160 may transfer the determination result to the calculation device 170, the gear position decision device 180, and/or the controller 110.

The calculation device 170 calculates a target velocity and a target distance when the determination device 160 decides to perform the deceleration tracking control based on the forward vehicle 20.

The calculation device 170 may decide, as the target velocity of the vehicle 10, the value obtained by adding a threshold value to the velocity of the forward vehicle 20. The threshold value may be set to a value between a preset minimum threshold velocity and a preset maximum threshold velocity and may be varied depending on a change in the velocity of the forward vehicle 20.

Figure 3A:
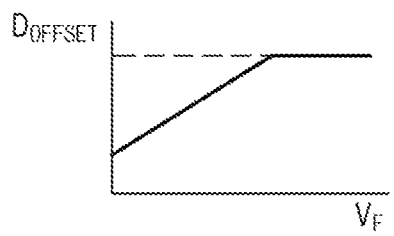
FIGS. 3A, 3B, 4, 5, and 6 are views illustrating embodiments that are referred to in describing a shift operation of the transmission control apparatus of the vehicle according to an exemplary embodiment of the present disclosure.

FIG. 3A illustrates an embodiment of the threshold value varying depending on the velocity change of the forward vehicle 20.

The calculation device 170 may decide, as the target distance of the vehicle 10, the value obtained by subtracting an offset distance from the distance between the vehicle 10 and the forward vehicle 20. The offset distance may be set to an inter-vehicle distance that is maintained based on the velocity of the forward vehicle 20.

Figure 3B:
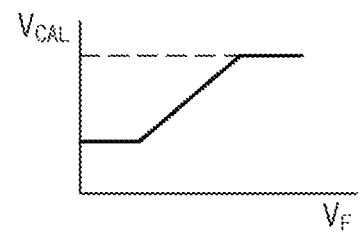

FIG. 3B illustrates an embodiment of the offset distance varying depending on the velocity of the forward vehicle 20.

The gear position decision device 180 may construct deceleration profiles for respective gears, based on the target velocity and the target distance calculated by the calculation device 170 and may decide, as the final gear, the gear converging to the target velocity at a target position. The target position refers to the forward position located the target distance from the current position of the vehicle 10.

The deceleration profiles for the respective gears may be constructed by using Equation 1 below.

$$V_i(t) = A_i t^2 + (B_i - g \sin \theta)t + v_0 \quad \text{[Equation 1]}$$

Here, "A" denotes the curve fitting second-order coefficient, "B" denotes the curve fitting first-order coefficient, "i" denotes gear, "g" denotes the acceleration of gravity, "θ" denotes the grade, and "$v_0$" denotes the initial (current) vehicle velocity.

Figure 4:
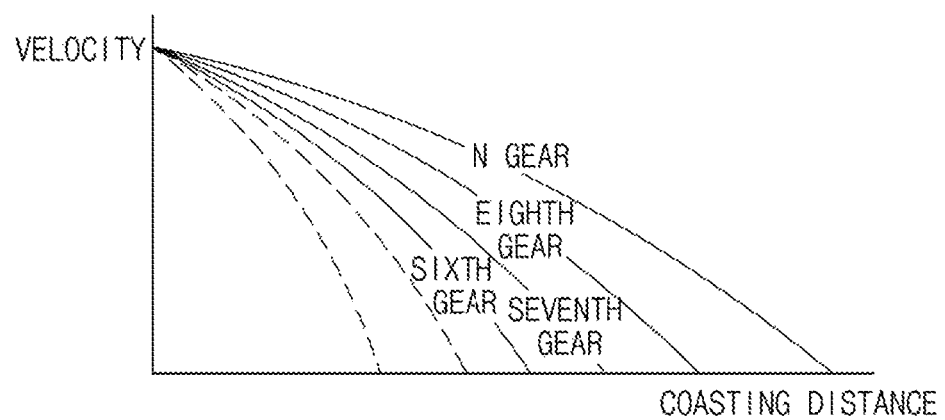

FIG. 4 illustrates an exemplary embodiment of the deceleration profiles for the respective gears that are constructed by using Equation 1.

The gear position decision device 180 determines the final gear converging to the target velocity $V_T$ at the target position, based on the deceleration profiles for the respective gears according to the embodiment of FIG. 4.

The controller 110 may be a processor or microprocessor such as a computer, a central processing unit (CPU), or an electronic control unit (ECU), configured to control functions of the determination device 160, the calculation device 170, and the gear position decision device 180. In addition, each of the determination device 160, the calculation device 170, and the gear position decision device 180 may be a processor or embedded in the controller 110 as one control unit.

Figure 5:
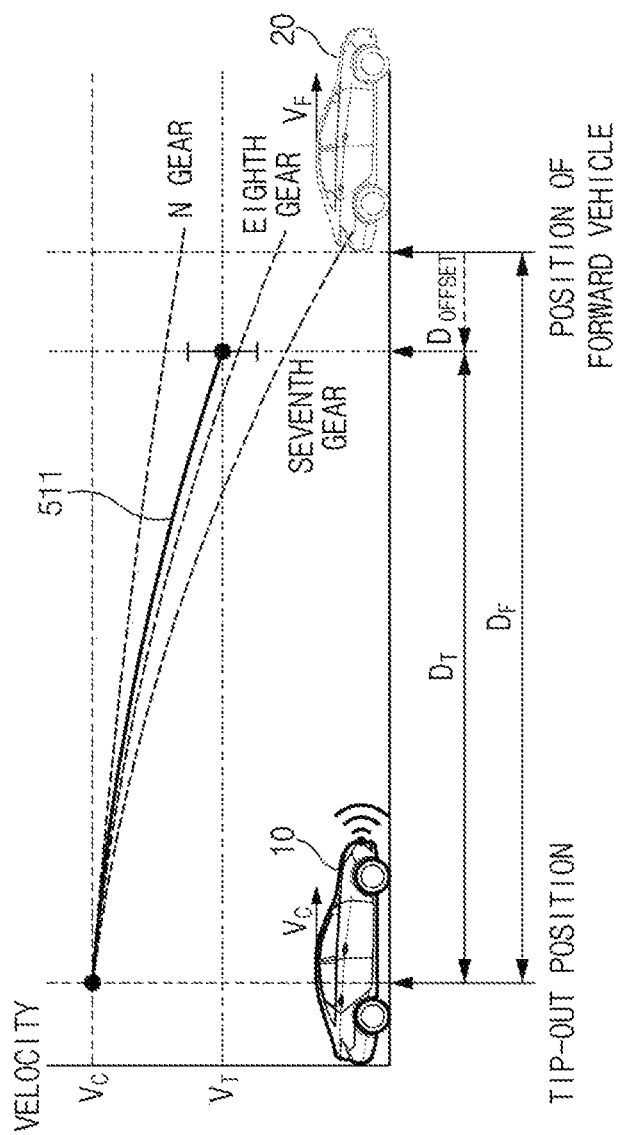

FIG. 5 illustrates an exemplary embodiment of the operation of deciding the final gear.

Referring to FIG. 5, the target velocity $V_T$ may be set to the sum of the current velocity $V_F$ of the forward vehicle 20 and the threshold value $V_{CAL}$, assuming that the current velocity of the vehicle 10 is $V_C$ with respect to the position where a tip-out of the accelerator pedal of the vehicle 10 occurs, the forward vehicle 20 is located the distance $D_F$ ahead of the vehicle 10, and the current velocity of the forward vehicle 20 is $V_F$.

Furthermore, the target distance $D_T$ may be set to the distance obtained by subtracting the offset distance $D_{OFFSET}$ from the distance $D_F$ between the vehicle 10 and the forward vehicle 20.

The gear position decision device 180 may decide, as the final gear, the gear that converges to the target velocity at the target position when the deceleration profiles for the respective gears are applied based on the current velocity of the vehicle 10.

The gear position decision device 180 may decide the final gear to be eighth gear because a deceleration graph 511 to the target position with respect to the current velocity of the vehicle 10 is located between the eighth gear and the N gear.

Accordingly, the controller 110 controls the transmission to track the deceleration profile based on the final gear decided by the gear position decision device 180.

Figure 6:
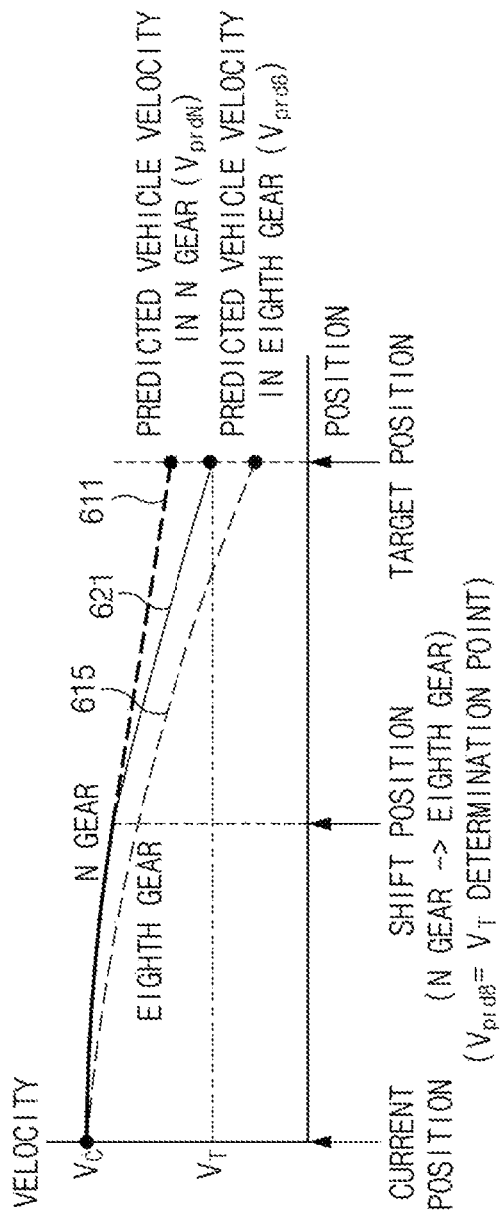

FIG. 6 illustrates an exemplary embodiment of the operation of controlling the transmission of the vehicle 10.

In FIG. 6, reference numeral 611 indicates the deceleration graph when the vehicle 10 travels in the N gear, reference numeral 615 indicates the deceleration graph when the vehicle 10 travels in the eighth gear, and reference numeral 621 indicates the deceleration graph when the transmission shifts into the eighth gear from the N gear.

Referring to FIG. 6, the controller 110 performs neutral control from the current position of the vehicle 10 to a predicted shift position, and performs a shift from the N gear into the eighth gear, based on the information about the final gear, which is decided by the gear position decision device 180, when the vehicle 10 reaches the predicted shift position. The predicted shift position may be determined to be a deceleration start position where a predicted velocity at the target position is the target velocity when deceleration starts based on the deceleration profile corresponding to the eighth gear.

The controller 110 performs deceleration control to allow the velocity of the vehicle 10 to reach the target velocity at the target position, while maintaining the eighth gear from the predicted shift position to the target position.

Accordingly, the vehicle 10 may decelerate to the target velocity when reaching the target position, without excessive deceleration and/or re-acceleration.

The transmission control apparatus 100 of the vehicle 10 according to this embodiment, which operates as described above, may be implemented in the form of an independent hardware device that includes a memory and a processor for processing each operation, and may be driven in the form included in another hardware device such as a microprocessor or a generic-purpose computer system.

Operations of the above-configured transmission control apparatus 100 of the vehicle 10 according to the present disclosure will be described below in more detail.

Figure 7:
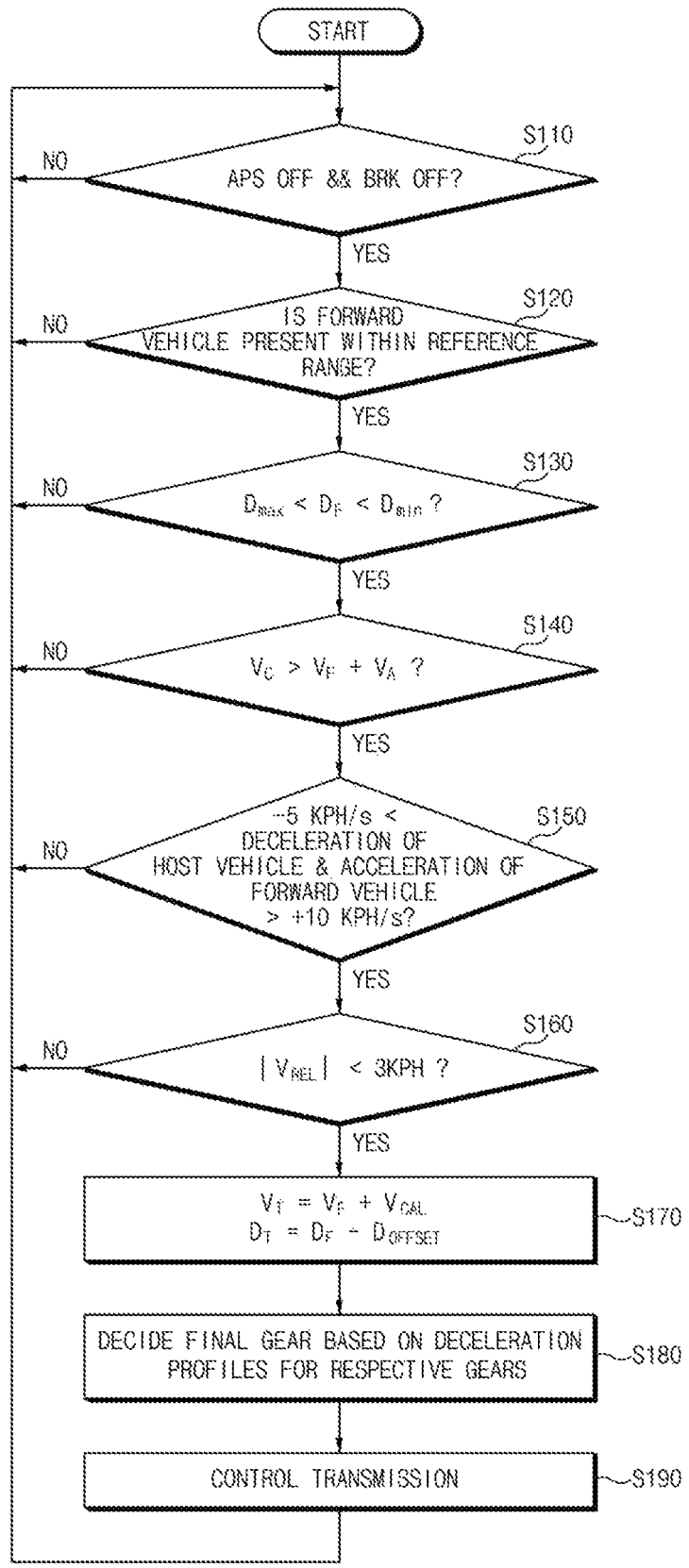
FIG. 7 is a flowchart illustrating a transmission control method for a vehicle according to an exemplary embodiment of the present disclosure.

FIG. 7 is a flowchart illustrating a transmission control method for a vehicle according to an exemplary embodiment of the present disclosure.

Referring to FIG. 7, when the brake is switched off in an APS-off state (S110), the transmission control apparatus 100 allows the vehicle 10 to start to coast.

The transmission control apparatus 100 of the vehicle 10 determines whether the forward vehicle 20 is present ahead of the vehicle 10, by using a sensor such as radar (S120).

When the forward vehicle 20 is present ahead of the vehicle 10, the transmission control apparatus 100 of the vehicle 10 detects the distance $D_F$ between the vehicle 10 and the forward vehicle 20 and determines whether the corresponding distance $D_F$ is longer than the minimum reference distance $D_{MIN}$ and shorter than the maximum reference distance $D_{MAX}$.

When it is determined that the distance $D_F$ between the vehicle 10 and the forward vehicle 20 satisfies the condition "$D_{MIN} < D_F < D_{MAX}$" (S130), the transmission control apparatus 100 of the vehicle 10 compares the velocity $V_C$ of the vehicle 10 and the velocity $V_F$ of the forward vehicle 20. When it is determined that the condition "$V_C > V_F + V_A$" is satisfied (S140), the transmission control apparatus 100 of the vehicle 10 determines whether the deceleration of the vehicle 10 and the acceleration of the forward vehicle 20 satisfy reference conditions. In other words, the transmission control apparatus 100 of the vehicle 10 determines whether the deceleration of the vehicle 10 exceeds the reference deceleration, for example, −5 KPH/s and the acceleration of the forward vehicle 20 exceeds the reference acceleration, for example, +10 KPH/s (S150).

Furthermore, the transmission control apparatus 100 of the vehicle 10 may determine whether the relative velocity $V_{REL}$ between the vehicle 10 and the forward vehicle 20 is below the reference velocity, for example, 3 KPH (S160).

When it is determined that the states of the vehicle 10 and the forward vehicle 20 satisfy all of the determination conditions in processes S130, S140, S150, and S160, the transmission control apparatus 100 of the vehicle 10 may decide to perform the deceleration tracking control based on the velocity of the forward vehicle 20.

For the deceleration tracking control based on the velocity of the forward vehicle 20, the transmission control apparatus 100 of the vehicle 10 calculates the target velocity $V_T$ and the target distance $D_T$ (S170).

In process S170, the transmission control apparatus 100 of the vehicle 10 may decide, as the target velocity $V_T$ of the vehicle 10, the value obtained by adding the threshold value $V_{CAL}$ to the velocity $V_F$ of the forward vehicle 20. Furthermore, the transmission control apparatus 100 of the vehicle 10 may decide, as the target distance $D_T$ of the vehicle 10, the value obtained by subtracting the offset distance $D_{OFFSET}$ from the distance $D_F$ between the vehicle 10 and the forward vehicle 20.

When the target velocity and the target distance are decided in process S170, the transmission control apparatus 100 of the vehicle 10 constructs the deceleration profiles for the respective gears and decides the final gear, based on the deceleration profiles for the respective gears (S180). Based on the deceleration profiles for the respective gears, the transmission control apparatus 100 of the vehicle 10 may determine, as the final gear, the gear converging to the target velocity at the target position.

When the final gear is decided in process S180, the transmission control apparatus 100 of the vehicle 10 controls the transmission, based on the deceleration profile of the final gear determined (S190).

Figure 8:
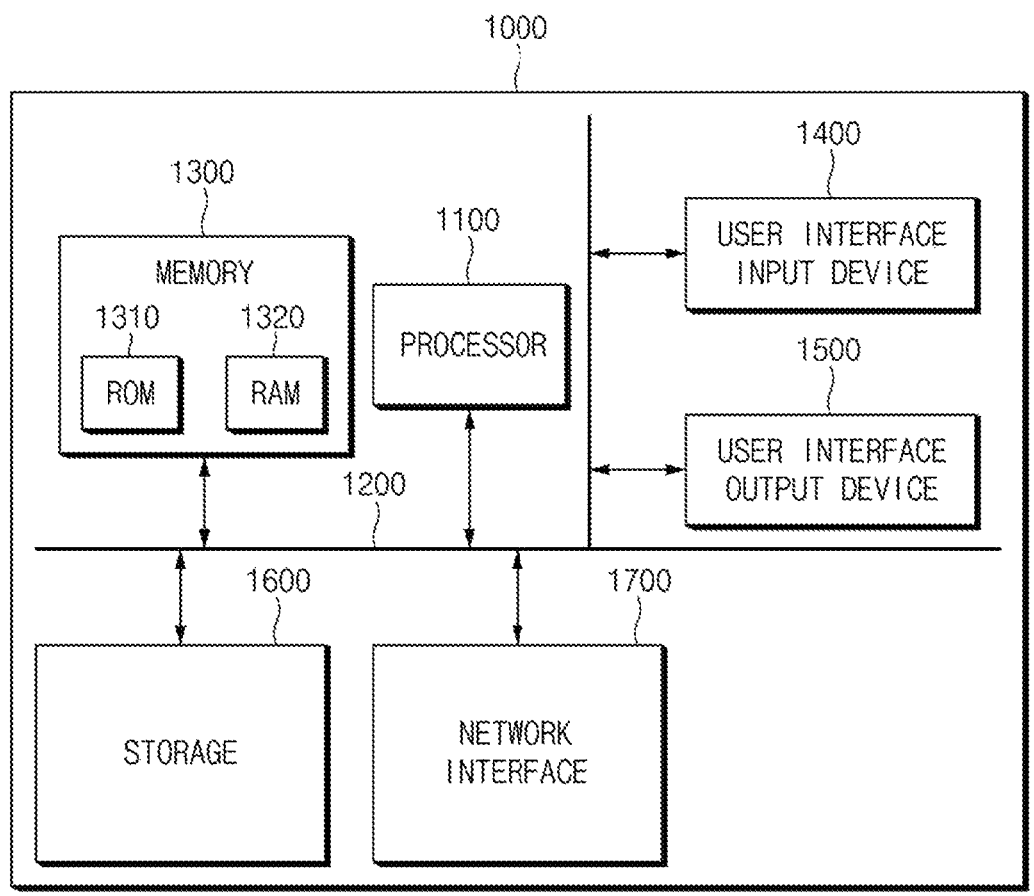
FIG. 8 is a view illustrating a computing system for executing a method according to an exemplary embodiment of the present disclosure.

FIG. 8 is a view illustrating a computing system for executing a method according to an exemplary embodiment of the present disclosure.

Referring to FIG. 8, the computing system 1000 may include at least one processor 1100, a memory 1300, a user interface input device 1400, a user interface output device 1500, storage 1600, and a network interface 1700, which are connected with each other via a bus 1200.

The processor 1100 may be a Central Processing Unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an Application Specific Integrated Circuit (ASIC). The ASIC may reside within a user terminal. In another case, the processor 1100 and the storage medium may reside in the user terminal as separate components.

According to the present disclosure, the transmission control apparatus and method of the vehicle decides the final gear based on the position and velocity of the forward vehicle when decelerating the vehicle due to the difference in velocity between the vehicle and the forward vehicle, thereby reducing the frequency of deceleration and re-acceleration, which in turn improves driver convenience and decelerates the vehicle in a fuel-efficient state.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling a transmission of a vehicle, the apparatus comprising:
a determination device configured to decide whether to perform a forward vehicle-based deceleration tracking control, based on information of the vehicle and a forward vehicle, when the vehicle starts to coast;
a calculation device configured to calculate a target velocity and a target distance based on a position and a velocity of the forward vehicle, when the forward vehicle-based deceleration tracking control is decided to be performed;
a gear position decision device configured to construct deceleration profiles for respective gears and decide a final gear based on the target velocity and the target distance calculated; and
a controller configured to control the transmission based on the final gear,
wherein the gear position decision device identifies a target position based on the target distance and decides, as the final gear, a gear converging to the target velocity at the target position, based on the deceleration profiles for the respective gears.

2. The apparatus of claim 1, wherein the determination device decides to perform the forward vehicle-based deceleration tracking control, when a velocity and a deceleration of the vehicle, the velocity and an acceleration of the forward vehicle, and a distance and a relative velocity between the vehicle and the forward vehicle satisfy reference conditions.

3. The apparatus of claim 2, wherein the determination device determines whether the distance between the vehicle and the forward vehicle is longer than a minimum reference distance and shorter than a maximum reference distance.

4. The apparatus of claim 2, wherein the determination device determines whether the velocity of the vehicle exceeds a sum of the velocity of the forward vehicle and a set value.

5. The apparatus of claim 2, wherein the determination device determines whether the deceleration of the vehicle exceeds a reference deceleration and the acceleration of the forward vehicle exceeds a reference acceleration.

6. The apparatus of claim 2, wherein the determination device determines whether the relative velocity between the vehicle and the forward vehicle is below a reference velocity.

7. The apparatus of claim 1, wherein the calculation device calculates the target velocity by adding a threshold value to the velocity of the forward vehicle.

8. The apparatus of claim 7, wherein the threshold value is a value between a preset minimum threshold velocity and a preset maximum threshold velocity and is varied depending on a change in the velocity of the forward vehicle.

9. The apparatus of claim 1, wherein the calculation device calculates the target distance by subtracting an offset distance from a distance between the vehicle and the forward vehicle.

10. The apparatus of claim 9, wherein the offset distance is set to an inter-vehicle distance that is maintained based on the velocity of the forward vehicle.

11. A method for controlling a transmission of a vehicle, the method comprising:
deciding whether to perform a forward vehicle-based deceleration tracking control, based on information of the vehicle and a forward vehicle, when the vehicle starts to coast;
calculating a target velocity and a target distance based on a position and a velocity of the forward vehicle, when the forward vehicle-based deceleration tracking control is decided to be performed;

constructing deceleration profiles for respective gears and deciding a final gear based on the target velocity and the target distance calculated; and controlling the transmission based on the final gear, wherein the deciding a final gear includes identifying a target position based on the target distance and deciding, as the final gear, a gear converging to the target velocity at the target position, based on the deceleration profiles for the respective gears.

12. The method of claim 11, wherein the deciding whether to perform a forward vehicle-based deceleration tracking control includes deciding to perform the forward vehicle-based deceleration tracking control, when a velocity and a deceleration of the vehicle, the velocity and an acceleration of the forward vehicle, and a distance and a relative velocity between the vehicle and the forward vehicle satisfy reference conditions.

13. The method of claim 12, wherein the deciding whether to perform a forward vehicle-based deceleration tracking control further includes determining whether the distance between the vehicle and the forward vehicle is longer than a minimum reference distance and shorter than a maximum reference distance.

14. The method of claim 12, wherein the deciding whether to perform a forward vehicle-based deceleration tracking control further includes determining whether the velocity of the vehicle exceeds a sum of the velocity of the forward vehicle and a set value.

15. The method of claim 12, wherein the deciding whether to perform a forward vehicle-based deceleration tracking control further includes determining whether the deceleration of the vehicle exceeds a reference deceleration and the acceleration of the forward vehicle exceeds a reference acceleration.

16. The method of claim 12, wherein the deciding whether to perform a forward vehicle-based deceleration tracking control further includes determining whether the relative velocity between the vehicle and the forward vehicle is below a reference velocity.

17. The method of claim 11, wherein the calculating a target velocity and a target distance includes:

calculating the target velocity by adding a threshold value to the velocity of the forward vehicle; and calculating the target distance by subtracting an offset distance from a distance between the vehicle and the forward vehicle.

18. The method of claim 17, wherein the threshold value is a value between a preset minimum threshold velocity and a preset maximum threshold velocity and is varied depending on a change in the velocity of the forward vehicle.

19. The method of claim 17, wherein the offset distance is set to an inter-vehicle distance that is maintained based on the velocity of the forward vehicle.

* * * * *